(12) United States Patent
VanLaningham et al.

(10) Patent No.: US 7,782,247 B1
(45) Date of Patent: Aug. 24, 2010

(54) SYSTEM AND METHOD FOR TARGET LOCATION

(75) Inventors: Steven VanLaningham, Richardson, TX (US); James A. Stevens, Lucas, TX (US); Alexander K. Johnson, Dallas, TX (US); Rachel A. Rivera, Murphy, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 104 days.

(21) Appl. No.: 12/220,618

(22) Filed: Jul. 25, 2008

(51) Int. Cl.
*G01S 13/08* (2006.01)
(52) U.S. Cl. .................. 342/118; 342/126; 342/146; 342/147
(58) Field of Classification Search .............. 342/90
See application file for complete search history.

(56) References Cited

U.S. PATENT DOCUMENTS

| | | | | |
|---|---|---|---|---|
| 3,812,493 A | * | 5/1974 | Afendykiw et al. | 342/145 |
| 5,097,269 A | * | 3/1992 | Takayama et al. | 342/453 |
| 5,138,587 A | * | 8/1992 | Mason | 367/136 |
| 5,818,383 A | * | 10/1998 | Stockburger et al. | 342/109 |

* cited by examiner

*Primary Examiner*—Thomas H Tarcza
*Assistant Examiner*—Timothy A Brainard
(74) *Attorney, Agent, or Firm*—Matthew J. Evans; Daniel M. Barbieri

(57) ABSTRACT

A method for method of estimating the position of one or more target nodes based on received reflections of a primary signal. The method includes receiving a primary signal from a transmitter node having a known location at a receiver node having a known location and receiving at least one reflected signal at the receiver node, the reflected signal generated by a reflection of the primary signal by a target node having an unknown location. The method further includes applying a target position algorithm to the primary signal and the at least one reflected signal to generate target location information.

6 Claims, 7 Drawing Sheets

SYSTEM AND METHOD FOR TARGET LOCATION

BACKGROUND

The present invention relates generally to the field of systems and methods for determining a target position using analysis of radio transmissions. More particularly, the present invention relates to a system and method for utilizing coordinated radio frequency signal receptions from a distributed network of transceivers to detect and track targets.

A software defined radio system is a radio communication system where components that have typically been implemented in hardware (i.e. mixers, filters, amplifiers, modulators/demodulators, detectors. etc.) are instead implemented using software. Soft ware defined radios may further be configured as dual purpose devices to perform additional functions, as signals intelligence (SIGINT).

SIGINT is intelligence-gathering by interception of signals, whether between people (i.e., COMINT or communications intelligence) or between machines (i.e., ELINT or electronic intelligence), or mixtures of the two. Communications intelligence (COMINT) is a sub-category of signals intelligence that engages in dealing with messages or voice information derived from the interception of foreign communications. Electronic signals intelligence (ELINT) is intelligence gathering by use of electronic sensors.

The data that is available from SIGINT may reveal information about an opponent's defense network, especially the electronic parts such as radars, surface-to-air missile systems, aircraft, etc. SIGINT can be used to detect ships and aircraft by their radar and other electromagnetic radiation. SIGINT can be collected from ground stations near the opponent's territory, ships off their coast, aircraft near or in their airspace, or by satellite.

In addition to the content of signals, SIGINT provides information based on both type of electronic transmission and its originating location. Triangulation and more sophisticated radiolocation techniques, such as time of arrival methods, require multiple receiving points at different locations. These receivers send location-relevant information to a central point, or perhaps to a distributed system in which all participate, such that the information can be correlated and a location computed.

What is needed is a system and method for utilizing coordinated radio frequency signal receptions from a distributed network of transceivers to detect and track targets. What is further needed is such a system and method configured to distribute and receive echo delay information to improve the detection and tracking of the targets.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the invention relates to a method for method of estimating the position of one or more target nodes based on received reflections of a primary signal. The method includes receiving a primary signal from a transmitter node having a known location at a receiver node having a known location and receiving at least one reflected signal at the receiver node, the reflected signal generated by a reflection of the primary signal by a target node having an unknown location. The method further includes applying a target position algorithm to the primary signal and the at least one reflected signal to generate target location information.

Another embodiment of the invention relates to a system for estimating the position of one or more target nodes based on received reflections of a primary signal. The system includes a receiver associated with a receiver node having a known location and configured for receiving a primary signal from a transmitter node having a known location at a receiver node and receiving at least one reflected signal generated by a reflection of the primary signal by a target node having an unknown location. The system further includes a target location system configure to generate target location information by applying a target position algorithm to the primary signal and the at least one reflected signal.

Yet another embodiment of the invention relates to a method of estimating the position of one or more target nodes based on received reflections of a primary signal. The method includes receiving a primary signal from a transmitter node having a known location at a receiver node having a known location and receiving at least one reflected signal at the receiver node, the reflected signal generated by a reflection of the primary signal by a target node having an unknown location. The method further includes applying a target position algorithm to the primary signal and the at least one reflected signal to generate echo delay information, receiving echo delay information from at least one other transmitter and/or receiver node, and determining a centroid value for the generated echo delay information and the received echo delay information. The method yet further includes applying an estimation filter to the centroid value to generate target location information.

Alternative examples and other exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE PREFERRED EMBODIMENTS

Figure 1:
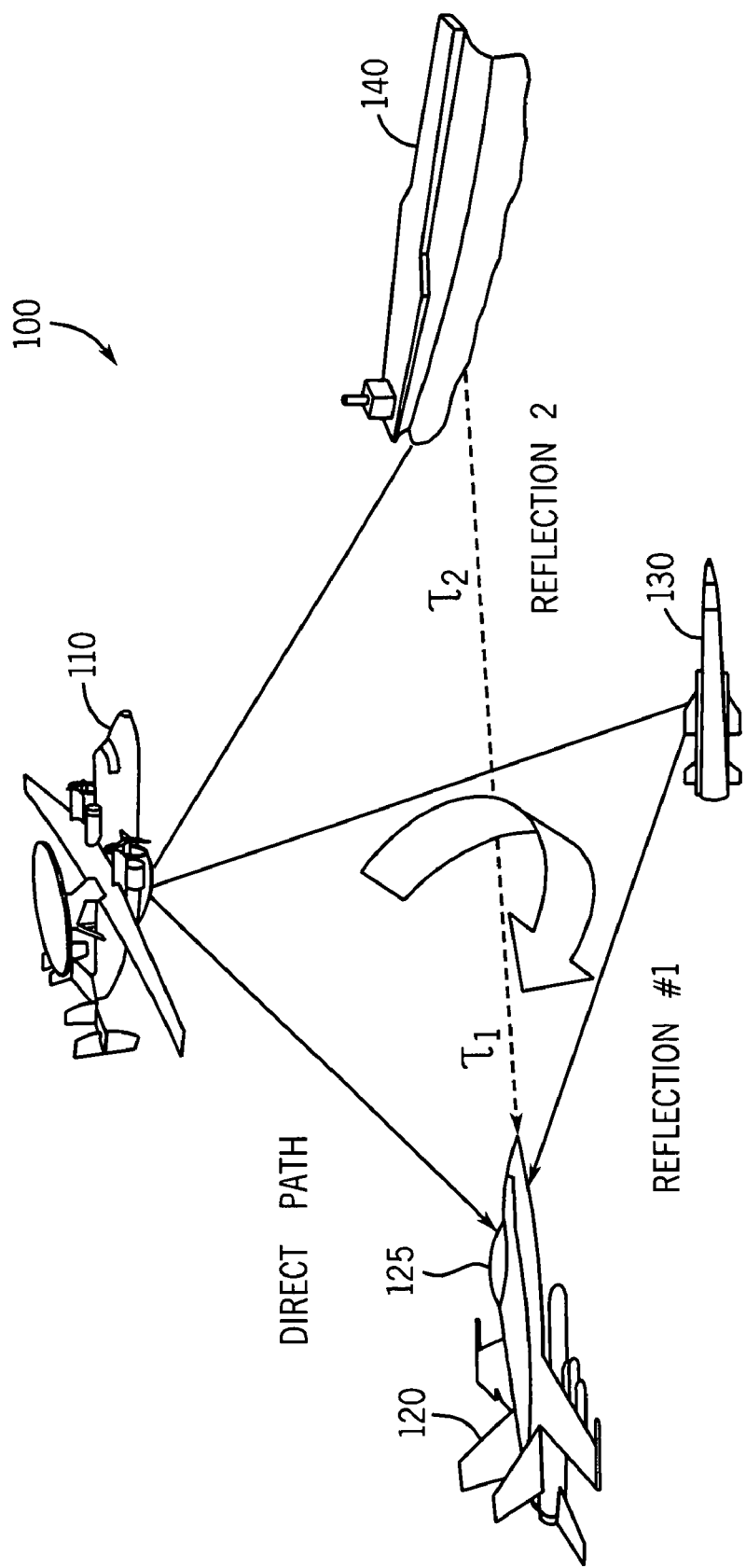
FIG. 1 is a communication network environment including a transmission source, a transmission receiver having a target location system, and first and second reflection nodes, according to an exemplary embodiment.

Before describing in detail the particular improved system and method, it should be observed that the invention includes, but is not limited to, a novel structural combination of conventional data/signal processing components and communications hardware and software, and not in particular detailed configurations thereof. Accordingly, the structure, methods, functions, control, and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, a communication network environment 100 including a transmission source 110, a transmission receiver 120 having a target location system 125, and first and second reflection nodes 130 and 140, respectively, is shown, according to an exemplary embodiment. Target location system 125 is configured to determine the location of, or illuminate, first and second reflection nodes 130 and 140 using received radio frequency (RF) signals received through transmission receiver 120, further described below with reference to FIGS. 2-7.

Transmission source 110 may be any transmission source having a known location. Although transmission source 110 is shown as an Airborne Early Warning and Control (AWAC) radar system on board an aircraft, transmission source 110 may be any type of transmitter, including both terrestrial and airborne transmitters. According to an exemplary embodiment, transmission source 110 may be any transmission source having a location known by target location system 125, such as a television station or FM radio tower. Advantageously, these types of transmitters are generally at a fixed location and emit a high-powered transmission signal.

Transmission receiver 120 may similarly be any transmission receiver having a known location. Although transmission receiver 120 is shown as an aircraft, transmission receiver 120 may be any type of receiver, including both terrestrial and airborne receivers. Transmission receiver 120 is configured to be couple to target location system 125.

Although transmission source 110 and transmission receiver 120 are shown and described in this exemplary embodiment, it should be understood that these elements may be components in a larger communication network including a plurality of communication nodes. Each node may include a transceiver that acts as transmission source 110 and/or transmission receiver 120. Further, nodes may enter and leave the communication network without affecting target determination as long as sufficient nodes having known location exist within the network.

First and second reflection nodes 130 and 140 may be any radio reflective target whose location is to be determined. The nodes may be aircraft, terrain features, or any other radio reflective object that reflect the RF signal from transmission source 110 such that the reflected signal is received by transmission receiver 120. Although only two reflection nodes are shown, it should be understood that network environment 100 may include many reflection nodes.

According to the exemplary embodiment, the RF signal transmitted between transmission source 110 and transmission receiver 120 defines a direct path 122 having a path length. The RF signal transmitted between transmission source 110 and transmission receiver 120, echoing off of reflection node 130, defines a first indirect path 122 having a path length $\tau_1$. Similarly, the RF signal transmitted between transmission source 110 and transmission receiver 120, echoing off of reflection node 140, defines a second indirect path 122 having a path length $\tau_2$.

Figure 2:
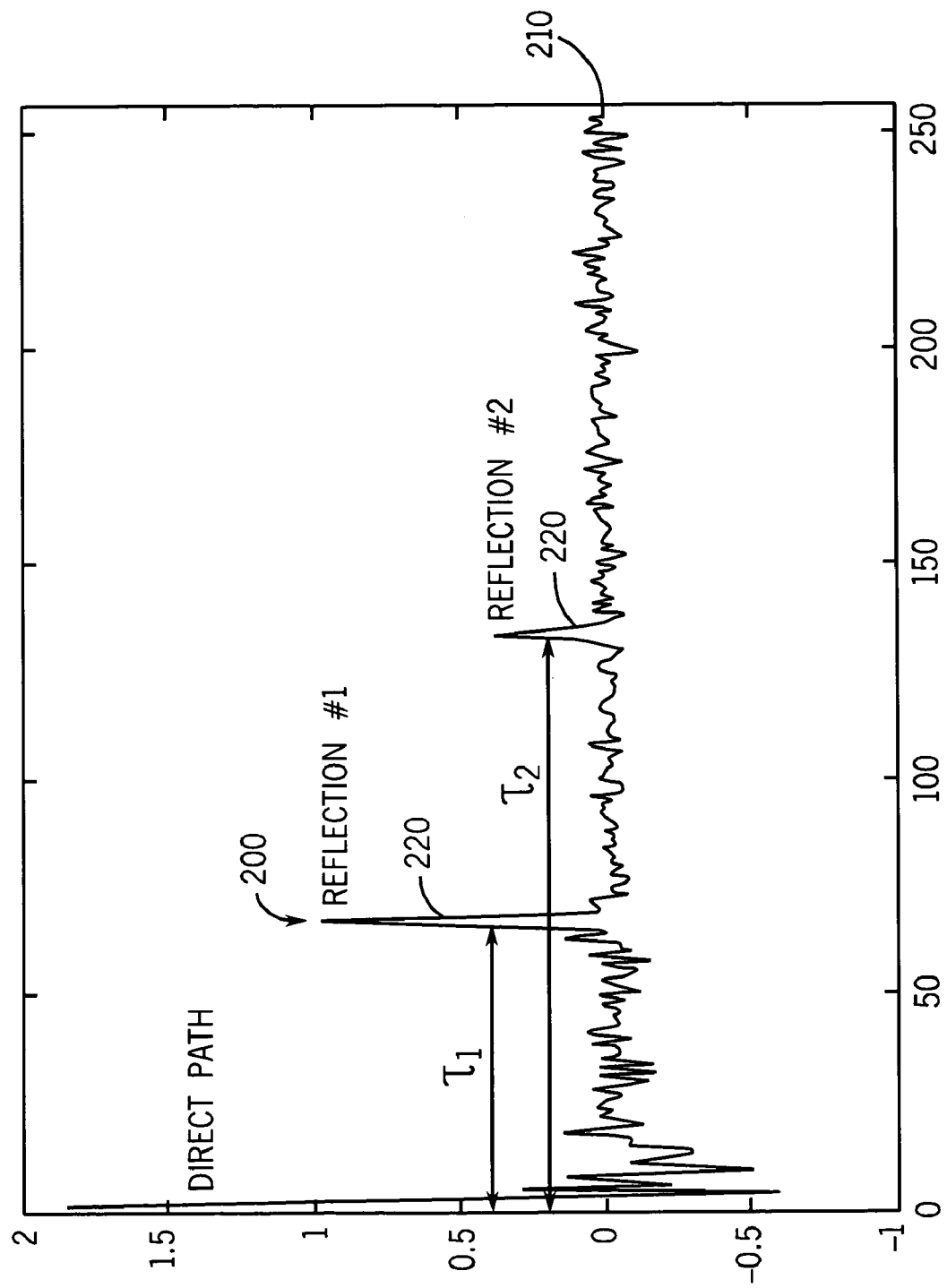
FIG. 2 is a graph illustrating inverse transform output for a compressed signal spectrum generated based on the received RF transmissions, according to an exemplary embodiment.

Referring now to FIG. 2, a graph 200 illustrating inverse transform output output generated based on the received RF transmissions is shown, according to an exemplary embodiment. The inverse transform output hereinafter "the Spectmur algorithm" output is the output generated by an algorithm to take the inverse transform of a compressed signal spectrum to generate echo delay information based on received replicants of a direct path signal. As shown in FIG. 2, a Spectmur output plot 210 includes one or more Spectmur peaks 220, the distance between which is representative of the difference in path length between a direct path signal and a reflected path signal.

Referring again to FIG. 1, target location system 125, described in further detail below, is configured to implement an active sensing algorithm that utilizes coordinated RF transmission from within a network of distributed transceivers to locate targets. RF illumination signals may be normal communication messages between radio transceivers 110 and 120 as shown in FIG. 1 or opportunistic signals from know transmitters the lie within the frequency range of the transceiver 120 (i.e., E2-C radar, FM and TV stations, etc.) These RF transmissions can be normal communication messages between nodes or specialized messages from a designated illuminator.

Target location system 125 may be configured to implement a target location algorithm, described in further detail below with reference to FIG. 3, to determine reflections (echoes) of the primary signal. The difference in path length between the direct path (from transmission source 110 to transmission receiver 120) and the reflected path is determined by the delay in the Spectmur peaks, as illustrated in FIG. 2. The path length difference information determined by the Spectmur receptions at each node may be exchanged between the nodes using normal radio transmissions. These radio transmissions may also be used as illumination sources, illustrating the active scanning being performed.

Figure 3:
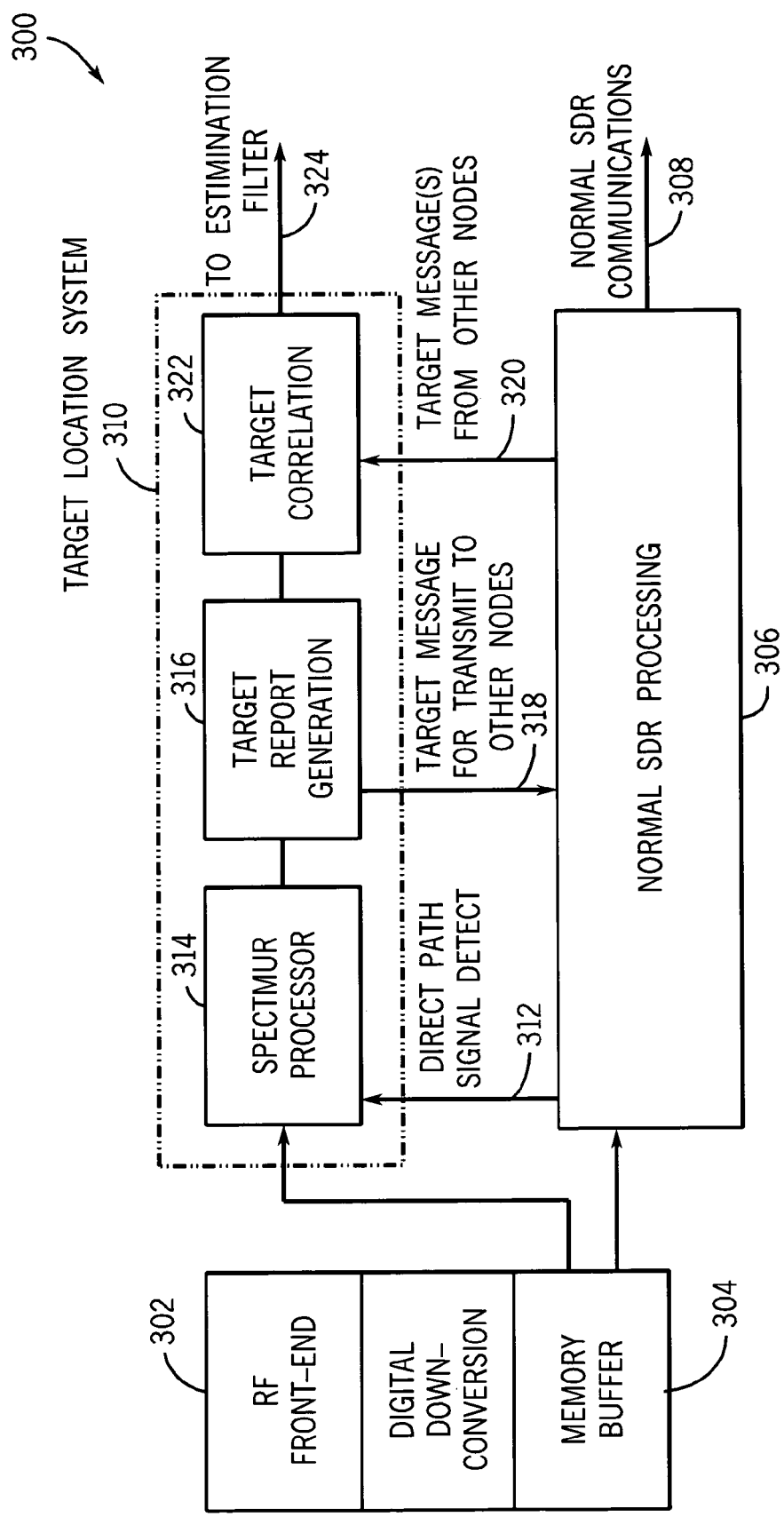
FIG. 3 is a target location system implemented in a software defined radio system, according to an exemplary embodiment.

Referring now to FIG. 3, a target location system 310 implemented in a software defined radio system 300 is shown, according to an exemplary embodiment. Software defined radio (SDR) 300 includes a radio frequency front-end 302 configured to receive a signal for digital down-conversion and storage in a memory buffer 304. The signal stored in memory buffer 304 may be processed by an SDR processor 306 to generate normal SDR communication 308. Since the target location system 310 is sensing reflections of a normal communication transmission, the preamble detection of SDR 300 may be used to trigger a target location process implemented by target location system 310.

Processor 306 may also be configured to generate a direct path signal detect 312 provided as an input to target location system 310 in combination with the signal stored in memory buffer 304. Target location system 310 includes a Spectmur processor 314, discussed in further detail below with reference to FIG. 5, which processes the direct path signal detect 312 and the signal stored in memory buffer 304 to generate a target report 316.

Target location system 310 is configured to transmit the target report to other nodes in a target message 318. Target location system 310 is further configured to receive and process target messages 320 from other nodes. Target location system 310 further includes a target correlation processor 322 configured to generate path length difference observations 324, further described below with reference to FIG. 4.

Figure 4:
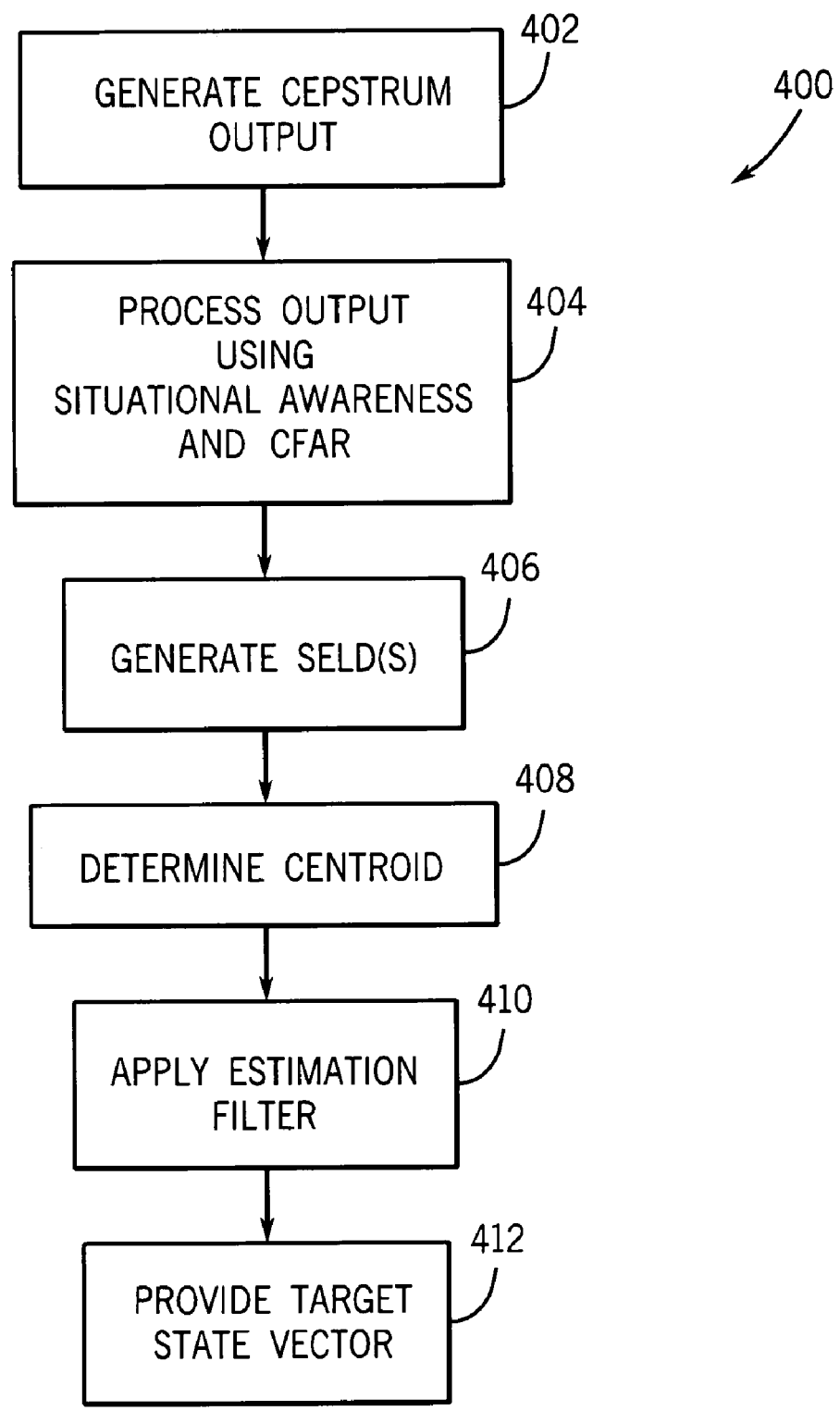
FIG. 4 is a flowchart illustrating a method for using coordinated RF signal receptions from a distributed network of software defined radios to detect and track targets, according to an exemplary embodiment.

Referring now to FIG. 4, a flowchart 400 illustrating a method for using coordinated RF signal receptions from a distributed network of software defined radios to detect and track targets is shown, according to an exemplary embodiment. The RF illumination signals can be normal communication messages between radios and/or opportunistic signals from known transmitters that lie within the frequency rage of the radio. The method using a distributed Spectmur algorithm to locate reflections of the primary signal and to estimate the position of the target(s) causing the reflections by distributing the echo delay information between the networked radio nodes. No a priori information about the signal is needed other than the position of the predominant transmission source. The described method may be used with pulsed, spread, narrow and broadband signals regardless of modulation type.

Figure 5:
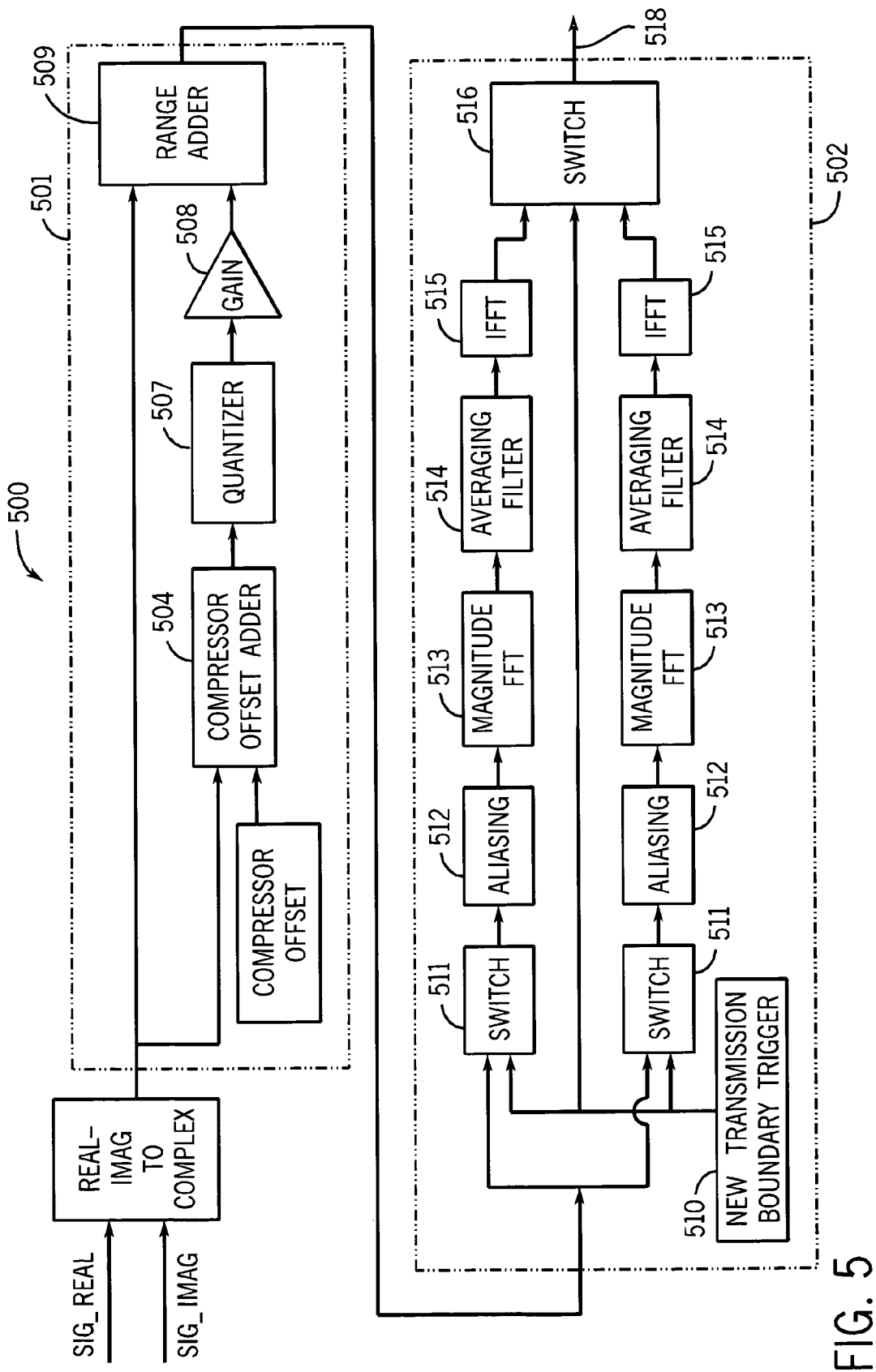
FIG. 5 is a flowchart illustrating a method for computation of the inverse transform output, according to an exemplary embodiment.

In a step 402, a signal is received and used to compute a Spectmur output. Referring now to FIG. 5, a flowchart 500 illustrating a method for computation of the Spectmur is shown, according to an exemplary embodiment. The method of flowchart 500 may be implemented during normal software defined radio communications using existing SDR hardware. The Spectmur sensing algorithm operates by using the time delay between primary and secondary (multipath echo) reflected signals received from a target to determine an actual difference in path length taken by these signals. The Spectmur is closely related to an autocorrelation function with the exception that the Spectmur contain the natural log, enabling Spectmur processor 322 to perform well using narrow band "colored" signals.

One of ordinary skill in the art would understand that although flowchart 400 is shown and described herein as having a specific number of steps performed in a specific order, the method may be implemented using more, fewer, and/or a different ordering of steps to perform the functions described herein. Further, although the system and method are described herein with reference to software defined radios, the system and method may be implemented using any communication network and associated systems.

Referring now to FIG. 5, a Spectmur processing engine 500 for generating Spectmur output is shown, according to an exemplary embodiment. A signal is received and stored in the memory buffer 304 for processing by engine 500, the received signal including both a real and an imaginary component. The signal may be digitally downconverted for further processing.

Typically, autocorrelation and Spectmur algorithms have limited dynamic ranges. This may be overcome by processing the received signal using a dynamic range compressor engine 501. Compressor engine 501 is configured to eliminate small signals from the received signal to increase the dynamic range. The compressor 501 receives the signal and combines the real and imaginary components to form a complex signal that is provide to a range adder 509 and a compressor offset adder 504. Compressor offset adder 504 is configured to position the received signal, using a compressor offset, in the middle of a range associated with a quantizer 507. Quantizer 507 is configured to filter any signal that does not trigger the quantizer (i.e., weaker signal).

Quantizer 507 allows the strong direct signal to be captured along the secondary path. The weaker (reflected) signal is not strong enough to change the quantizer levels and therefore is eliminated in the secondary path 505-508. When the resultant strong signal from quantizer 507 is subtracted from the complex signal using adder 509 only the weaker signal of interest remains. In other words, a large portion of the relatively pure strong signal (as determined by the gain 508 in the secondary path) is subtracted from the mixed signal in the primary path at step 509. This reduces the dynamic range (i.e., the difference between the direct path and the reflected path) of the incoming signal and makes the Spectmur or autocorrelation algorithm more effective in detecting weak reflection signals. This compressed signal is provided as an input to the Spectmur engine 502.

The Spectmur engine 502 is used to generate Spectmur output 518. A new boundary transmitter toggle trigger 510 is used to identify boundaries of received transmissions. This toggle, for example, drives switches 511 and 516 which alternate the set of Spectmur components (511-516) in use on a transmission-by-transmission basis. This is done in order to allow settling of the averaging filters 514 during the "off" period so that irrelevant data from previous transmissions does not spill over. The effect of taking the Magnitude FFT 513, low-pass filtering the output 514, and then taking the Inverse FFT 515 of the filtered signal results in the Spectmur output which corresponds to echoes or delays of the primary (direct path) signal. The value along the X-axis of the Spectmur has units of delay that correspond to the delay induced by the additional length of the reflected path versus that of the direct path.

The compressed signal may be processed by an anti-aliasing processor 512 to eliminate aliasing. Aliasing can occur when the difference in the delay of the reflected path compared to that of the direct path is greater than $\tau=1/(2*\Delta f)$ where $\Delta f$ is the frequency resolution of the first FFT in the set of Spectmur components 511-516. To eliminate aliasing, anti-aliasing processor 512 utilizes zero-padding prior to FFT 513 such that the resultant frequency resolution $\Delta f'$ is sufficiently small such that $\tau'<1/(2*\Delta f')$ is greater than the maximum possible delay path that can be received by the receiver.

Referring again to FIG. 4, following generation of the Spectmur output, system 125 may be configured to process the output based on situational knowledge information and a constant false alarm rate (CFAR) in a step 404 (also shown in 503). It is desirable to minimize the amount of data that is required to be transmitted between the nodes in messages 318 and 320. One method for reducing this traffic is to use situational awareness information of known reflections to compute the Spectmur delay and blank these peaks in the Spectmur output prior to target declaration.

Another method includes using situational awareness information to eliminate processing of sea/ground clutter. This method includes using the known positions of the transmission source 110 and transmission receiver 120 and their height above the surface of the Earth to determine and blank clutter delay positions in the Spectmur output prior to target declaration. Reflections arriving at a delay corresponding to the expected delay of surface reflections are blanked. The width of the blank can be set using a Constant False Alarm Rate algorithm, described below, in Spectmur delay as opposed to magnitude. The width, for example, may vary depending of the roughness of the sea or land surface roughness.

Figure 6:
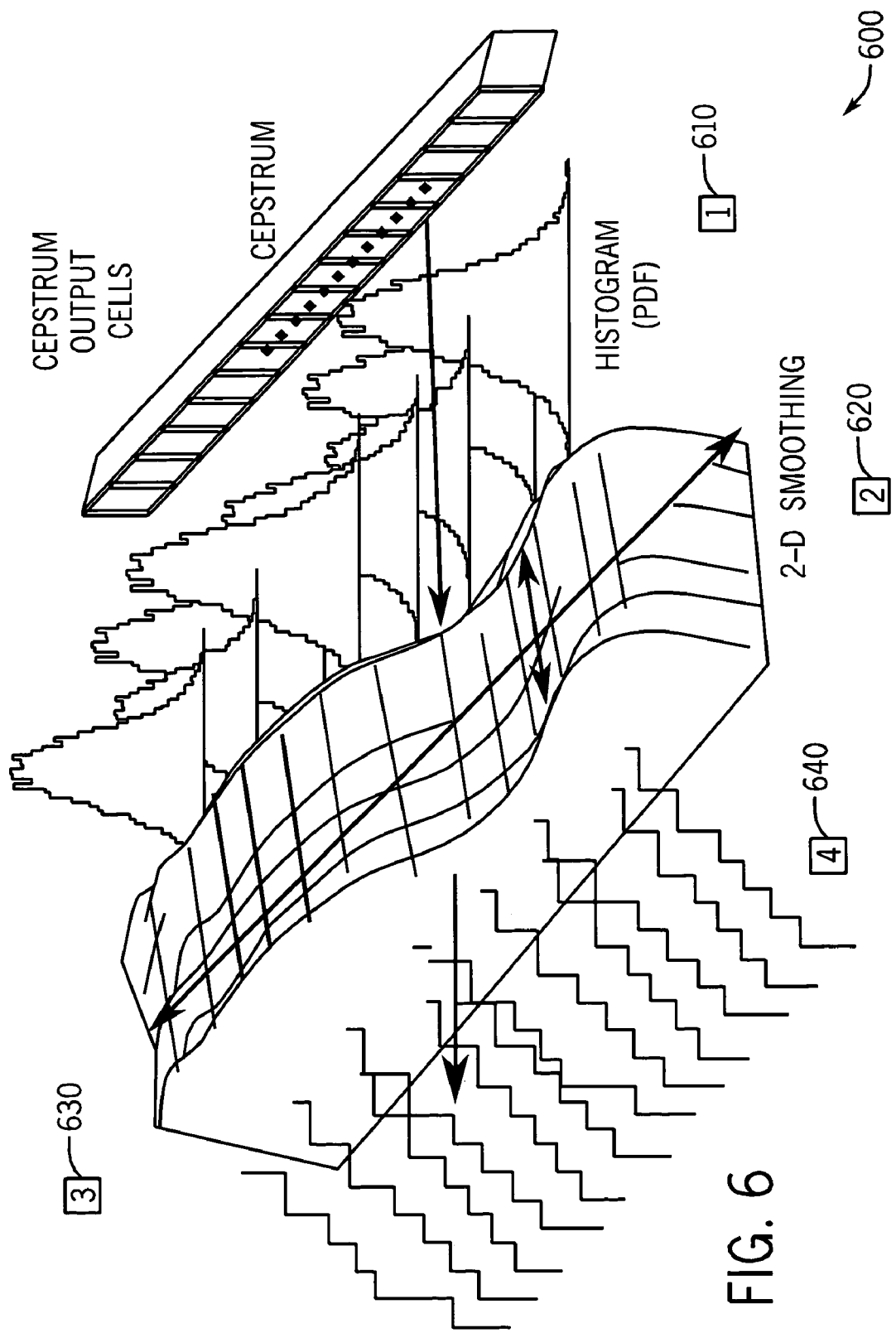
FIG. 6 is a flowchart illustrating a constant false alarm rate inverse transform output profiling method, according to an exemplary embodiment.
Figure 7:
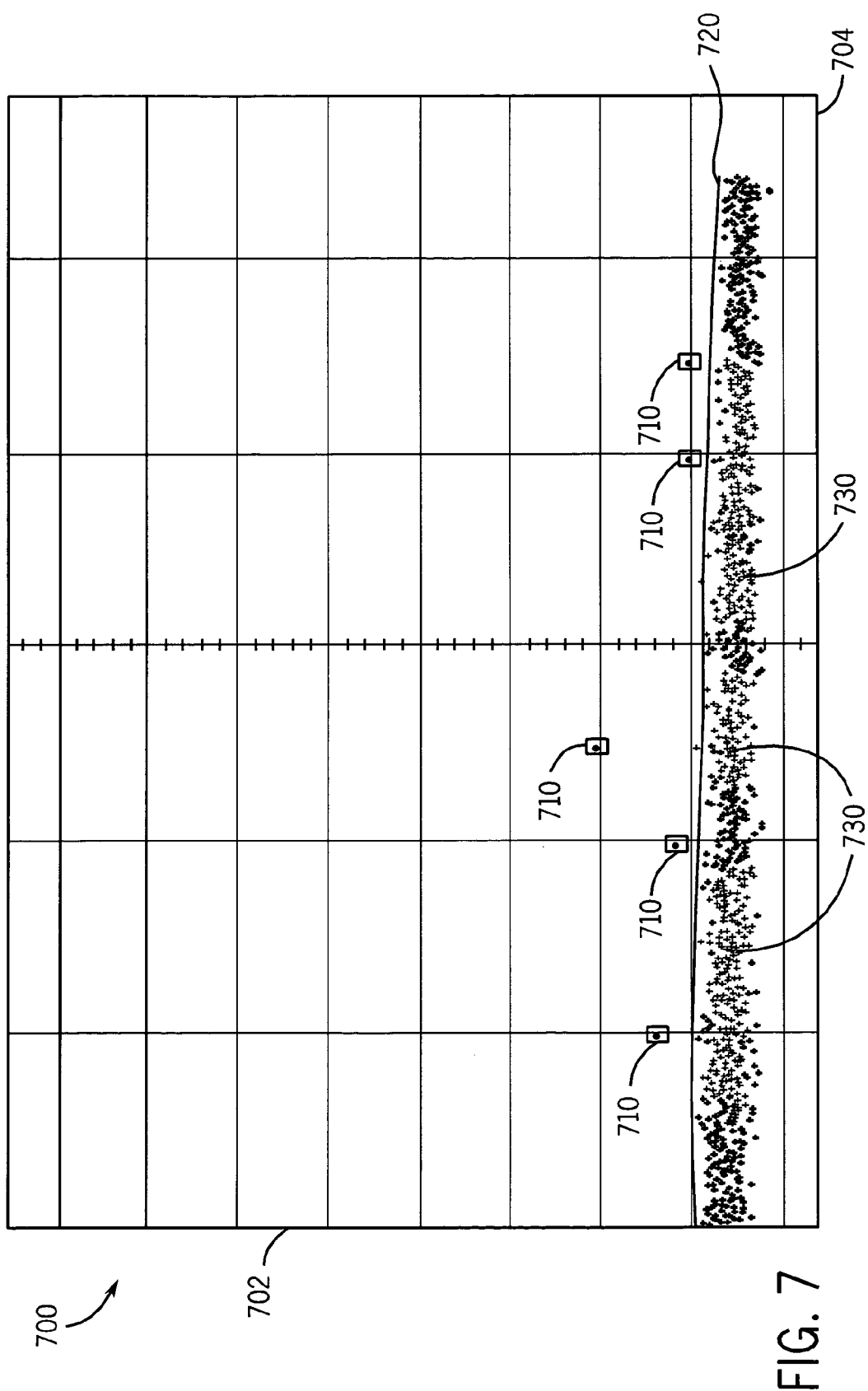
FIG. 7 is a graph illustrating application of the generated threshold in the elimination of sea/ground clutter in a diffuse reflective environment, according to an exemplary embodiment.

Referring now to FIG. 6, a flowchart 600 illustrating a constant false alarm rate Spectmur profiling method is shown, according to an exemplary embodiment. Method 600 may be used to determine a threshold to be used on the Spectmur output. In a first step 610, continuous variable length histograms with configurable bin sizes may be run in parallel on each of the Spectmur cell outputs. The histograms may be processed in a step 620 using a smoothing filter to generate a plurality of smoothed histograms. The smoothed histograms are then processed using a continuous cumulative distribution function in a step 630. In a step 640, a threshold for each Spectmur cell is determined using a preset false alarm rate and the cumulative distribution function. Referring now to FIG. 7, a graph 700 illustrating application of the generated threshold in the elimination of sea/ground clutter in a diffuse reflective environment is shown, according to an exemplary embodiment. A first axis 702 describes SELD returns and a second axis 704 represents time. Targets 710 are shown above a constant false alarm rate threshold 720 set above the diffuse sea clutter returns 730.

Referring again to FIG. 4, in a step 406 the processed Spectmur output may be used to calculate the Spectmur equivalent length difference (SELD) equal to the difference in path length between the primary and secondary signals. The SELD may be computed using the equation:

$$SELD = \tau_m c \text{ where } m=0, 1, \ldots, N \quad (1)$$

where $\tau_m$ is the delay in the $m_{th}$ secondary path (with m=0 as the primary path with $\tau_{m=0}$ and c is the propagation velocity of the RF signal.) Equation 1 assumes a measurable length between the transmitting and receiving platform. The greater the number of nodes, the more accurate the target position data that can be generated.

For a single transmit and receive pair, assuming that the transmitting (emitter) position $E_{x,y,z}$ and the receiver position $R_{x,y,z}$ are known, the SELD may be computed by the Equation:

$$SELD = D_{TE} + D_{TR} - D_{ER} = \sqrt{(E_x - T_x)^2 + (E_y - T_y)^2 + (E_z - T_z)^2} + \sqrt{(R_x - T_x)^2 + (R_y - T_y)^2 + (R_z - T_z)^2} - \sqrt{(E_x - R_x)^2 + (E_y - R_y)^2 + (E_z - R_z)^2}$$

where $D_{TE}$ is equal to the distance between the target and the emitter, $D_{TR}$ is the distance between the target and the receiver and $D_{ER}$ is the distance between the emitter and the receiver. This equation produces a surface of potential solutions for the target position. The unknowns of this equation are the target positions $T_x$, $T_y$, and $T_z$. Since there is one equation and three unknowns, the target position cannot be determined using this single observation.

For a three dimensional target position determination with three SELD measurements, second and third receivers are added such that the target position can be resolved to a point in space. The SELD may be computed by the Equations:

$$SELD_1 = D_{TE} + D_{TR1} - D_{ER1} = \sqrt{(E_x - T_x)^2 + (E_y - T_y)^2 + (E_z - T_z)^2} + \sqrt{(R1_x - T_x)^2 + (R1_y - T_y)^2 + (R1_z - T_z)^2} - \sqrt{(E_x - R1_x)^2 + (E_y - R1_y)^2 + (E_z - R1_z)^2}$$

$$SELD_2 = D_{TE} + D_{TR2} - D_{ER2} = \sqrt{(E_x - T_x)^2 + (E_y - T_y)^2 + (E_z - T_z)^2} + \sqrt{(R2_x - T_x)^2 + (R2_y - T_y)^2 + (R2_z - T_z)^2} - \sqrt{(E_x - R2_x)^2 + (E_y - R2_y)^2 + (E_z - R2_z)^2}$$

$$SELD_3 = D_{TE} + D_{TR3} - D_{ER3} = \sqrt{(E_x - T_x)^2 + (E_y - T_y)^2 + (E_z - T_z)^2} + \sqrt{(R3_x - T_x)^2 + (R3_y - T_y)^2 + (R3_z - T_z)^2} - \sqrt{(E_x - R3_x)^2 + (E_y - R3_y)^2 + (E_z - R3_z)^2}$$

Since there are three equations and three unknowns, the target position can be determined using this observation.

Following the SELD calculations, in a step 408, system 125 may be configured to correlate distributed SELD measurements with target centroids. Although a particular centroid correlation is described, it should be understood that any centroid correlation to identify suspected targets may be applied.

For each transmitter, receiver, and target group set, system 125 may be configured to iteratively compute a hypothesis SELD by substituting x, y, z grid locations for target location and compute a SELD error by taking the absolute value of the difference between the actual SELD value for the transmitter, receiver, and target group set and the hypothesis SELD for each x, y, z location to compute the average SELD error for each z location. System 125 may then determine for each location, whether the SELD error is less than a given fraction of the average SELD error and increment a histogram for this locations. Referring now to FIG. 7, a graph 700 of an exemplary histogram plot produced by system 125 revealing a target at (x=90, y=20, z=25) is shown, according to an exemplary embodiment. Then, for each z location, all histogram values greater than a set threshold (indicating a suspected target) are returned such that, for each transmitter, receiver, and target group set, a grid SELD is computed by substituting the returned histogram values of the suspected target for target location. Following this substitution, system 125 can determine whether the absolute value of the difference between the actual SELD value for the transmitter, receiver, and target group set and the grid SELD is greater than a threshold. This actual SELD value may be returned, indexed by this target entry.

In a step 410, the returned path length difference observations may then be correlated and fed as observations to a target position estimation filter, such as an Extended Kalman Filter, a recursive filter that estimates the state of a dynamic system from a series of incomplete and noisy measurements. The estimation filter is configured to providing accurate continuously-updated information about the position and velocity of an object given only a sequence of observations about its position, each of which includes some error. Once the SELD measurements are sorted according to target centroid and measurement time, they are fed individually to the Kalman filter(s) instantiated for each confirmed target centroid.

In step 410, a Kalman State Vector X is propagated to the time of each measurement via a State Transition Matrix, $\Phi$.

$$X_k = \Phi_{k-1} X_{k-1} + \omega_k$$

Where $X_k$—Target State Vector—$[T_x T_y T_z V_x V_y V_z]^T$, where T is a target position vector, V is a target velocity vector, and $\omega_k$ is the system process noise from $N(0.Q_k)$.

$$\Phi_{k-1} = \begin{matrix} 1 & 0 & 0 & \Delta t & 0 & 0 \\ 0 & 1 & 0 & 0 & \Delta t & 0 \\ 0 & 0 & 1 & 0 & 0 & \Delta t \\ 0 & 0 & 0 & 1 & 0 & 0 \\ 0 & 0 & 0 & 0 & 1 & 0 \\ 0 & 0 & 0 & 0 & 0 & 1 \end{matrix}$$

The measurement model is $z_k = h_k(X(t_k)) + \upsilon_k$ where $z_k$ is the Spectmur equivalent length difference measurement at time k and $h_k(X(t_k))$ is equal to the equation:

$$\sqrt{(E_x - T_x)^2 + (E_y - T_y)^2 + (E_z - T_z)^2} +$$
$$\sqrt{(R_x - T_x)^2 + (R_y - T_y)^2 + (R_z - T_z)^2} -$$
$$\sqrt{(E_x - R_x)^2 + (E_y - R_y)^2 + (E_z - R_z)^2}$$

where E is the position of the transmitting node or emitter at the time the CLED was made (time k), R is the position of the receiving node or emitter at the time the CLED was made (time k), and T is the estimated target position from the state vector X. υk is the measure noise from N(0, $R_k$) where $R_k$ is the variance of the SELD measurements at time k.

In a step 412, the target state vector is provided as an output. The target state vector provides information regarding both the current location and velocity of the target within three dimensional space.

Advantageously, target location system 125 may be used to increase the detection and tracking range of existing radar systems by using the radar's normal transmission as the Spectmur direct path. The participating radar node communicates it position to the other radio nodes which in turn communicate back bi-static detections made by system 125.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type and number of antenna us, the method in which frequency difference is used to resolved the phase ambiguity, the position of the antenna, etc. may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method of estimating the position of one or more target nodes based on received reflections of a primary signal, comprising:

receiving a primary signal from a transmitter node having a known location at a receiver node having a known location;

receiving at least one reflected signal at the receiver node, the reflected signal generated by a reflection of the primary signal by a target node having an unknown location;

applying a target position algorithm to the primary signal and the at least one reflected signal to generate echo delay information;

receiving echo delay information from at least one other transmitter and/or receiver node;

determining a centroid value for the generated echo delay information and the received echo delay information; and applying an estimation filter to the centroid value to generate target location information.

2. The method of claim 1, wherein the target position algorithm is at least one of a Spectmur algorithm and an Autocorrelation algorithm.

3. The method of claim 1, further including transmitting the echo delay information to at least on other transmitter and/or receiver node to increase the accuracy of the target position algorithm.

4. The method of claim 1, further including processing the echo delay information to eliminate known targets.

5. The method of claim 1, further including applying a constant false alarm rate to the echo delay information to eliminate sea/ground clutter.

6. The method of claim 1, wherein generating the target location information does not require a priori information about the signal.

\* \* \* \* \*